United States Patent [19]
Pepin

[11] Patent Number: 5,334,411
[45] Date of Patent: Aug. 2, 1994

[54] MULTILAYER CERAMIC CAPACITOR MANUFACTURING PROCESS
[75] Inventor: John G. Pepin, Newark, Del.
[73] Assignee: E. I. Du Pont de Nemours and Company, Wilmington, Del.
[21] Appl. No.: 2,991
[22] Filed: Jan. 11, 1993
[51] Int. Cl.⁵ .......................... B05D 5/12; H01G 7/00; H01G 4/06
[52] U.S. Cl. ..................... 427/79; 29/25.42; 361/311
[58] Field of Search .......... 427/79; 29/25.42; 361/311

[56] References Cited
U.S. PATENT DOCUMENTS 3,582,729 6/1971 Girard et al. .......................... 427/79
3,889,357 6/1975 Millard et al. ....................... 427/80
5,101,319 3/1992 Diffeyes et al. ...................... 361/321

OTHER PUBLICATIONS

*Journal of Materials Education*, Adair, et al., "A Review of the Processing of Electronic Ceramics," 1987, pp. 71–118.

*Primary Examiner*—Anthony McFarlane
*Assistant Examiner*—Nhat D. Phan

[57] ABSTRACT

The invention is directed to an MLC manufacturing process in which the electrode paste is cast or printed onto a rigid substrate. The dried surface of the electrode is rendered smooth to remove surface asperities and the prints are then transferred to the dielectric substrate through a mask which patterns the electrode print on the surface.

7 Claims, No Drawings

MULTILAYER CERAMIC CAPACITOR MANUFACTURING PROCESS

FIELD OF THE INVENTION

The invention is directed to a method for making multilayer ceramic capacitors. In particular, it is directed to such a method which will yield capacitors having thinner fired dielectric layers and thus will achieve higher capacitance per unit part volume.

BACKGROUND OF THE INVENTION

This invention generally relates to a new process for making monolithic multilayer ceramic capacitors (MLCs). The process involves a calendering step in which lumps or other imperfections are removed from the dried electrode print. This step enables use of thinner dielectric layers and the achievement of higher values of capacitance per unit part volume.

Multilayer ceramic capacitors consist of a plurality of interleaved and staggered layers of an electrically conductive film of metal (termed "electrode"), formed by the deposition (usually be screen printing or variations thereof) of a thick film paste (termed an "electrode composition") and electrically insulating layers of a ceramic oxide (termed "dielectric"), formed by laying a cast dielectric tape or by casting a dielectric slurry over the dried electrode. Such capacitors are well-known in the art. U.S. Pat. No. 2,389,420, for example, describes the structure, manufacture and properties of monolithic multilayer ceramic capacitors.

The electrode composition is usually a dispersion of finely divided precious metal powders such as palladium, silver, gold, or platinum or their mixtures in a vehicle which is usually solely organic in nature. Dispersions of non-precious metals such as copper and nickel have also been shown to have utility in electrode compositions. The vehicle is usually composed of a mixture of a polymeric resin which imparts viscosity to the composition and appropriate solvents for processing compatibility, particularly with respect to drying. Other organic additives are usually made to the vehicle to control paste rheology. Typical electrode composition metal concentrations range from 40 to 70% by weight, with the remainder being vehicle. Electrode compositions are deposited, usually be screen printing techniques, on dried dielectric layers, then dried to remove solvents and leave a mixture of metal powders and resin from the vehicle.

The dielectric layer is usually composed of finely-divided oxide powers dispersed in a resin. Barium titanate ($BaTiO_3$) and other oxides such as neodymium titanate ($Nd_2Ti_2O_7$) and magnesium titanate ($MgTiO_3$) are used. Additions are usually made to these oxides to control various electrical characteristics, particularly to maximize dielectric constant while controlling the temperature dependence of dielectric constant and electrical insulation resistance, among other properties. The resin is present in the dielectric layers to facilitate handling and printing of electrodes on the layers.

Multilayer ceramic capacitors are manufactured by building up an interleaved configuration of electrode and dielectric layers, dicing individual parts out of the build-up then subjecting the parts to a slow burnout then high temperature firing. Burnout is done to remove the organic resin in the electrode and dielectric layers to avoid rapid outgassing and rupture of the parts. Firing is done to a peak temperature to both densify the dielectric for maximum dielectric constant and physical strength, and to react the chemical constituents of the dielectric such that other desired electrical characteristics are achieved. During the firing step, the powder grains in the electrode layers also sinter and densify so as to produce a continuous, highly electrically conductive metal film.

Multilayer ceramic chip capacitors are made using two primary manufacturing processes: the "dry stack" and "wet stack" processes. An excellent review of MLC manufacturing processes is given in a paper by Adair et al., "A Review of the Processing of Electronic Ceramics with Emphasis on Multilayer Ceramic Capacitor Fabrication" in *Journal of Materials Education*, Vol. 9, pages 71–118 (1987). Both processes relate to the manner in which the dielectric layer is formed over the electrode lying underneath it. In the dry stack process the dielectric is cast into a tape from a slurry of dielectric powder, solvents, and pliable resins. The tape is placed over the dried electrode print, a subsequent electrode is printed on the tape, dried, and another tape is placed, etc. The dry stack process is limited in the thinness of the fired dielectric layer which can be achieved since the tape must be of sufficient thickness for handling. The "wet stack" process utilizes slurries of dielectric powder, solvents and resins, but involves casting, printing, or pouring the dielectric slurry directly over the dried electrode. The wet stack process is inherently capable of forming thinner dielectric layers since the requirements of tape handling are avoided.

A principal trend in MLC industry, and in electronics in general, is towards smaller components with higher electrical values per unit part volume. There are several ways to achieve this goal in multilayer ceramic capacitors. One way is to utilize ceramic dielectrics with higher dielectric constants. This is, however, limited by fundamental limitations with the solid state chemistry of the dielectrics. Another method is to have the capacitors contain as many electrically active layers as possible. This is limited by both physical restraints in the allowable part thickness and the tendency for high layer count parts to delaminate during burnout and/or firing.

A third way to achieve higher values of capacitance per unit part volume is to make the dielectric layers thinner so as to reduce the distance between electrodes of opposite polarity. This is possible using the finer dielectric powders now available and conventional tape casting or wet stack technology. The principal limitation, however, is the smoothness of the printed electrode.

In current MLC electrode paste technology, it is not unusual for a dried electrode surface to have asperities or lumps of metal protruding above the bulk of the print. In some cases these lumps can extend up to 15 microns above the print surface. If a dielectric tape of 20 microns dried thickness is placed over such a lump, the lump may protrude through the tape and come into contact with the opposing electrode. Such contact will result in an electrical short in the capacitor. Even if interelectrode contacts as described do not immediately occur, long term part reliability may still be questionable.

Reliability is a prime concern in multilayer ceramic capacitors. Electronic designers require high degrees of reliability in every component comprising an electrical circuit. In particular, they rely heavily on the reliability of the simpler passive components such as capacitors being higher than other components to compensate for lower degrees of reliability in other components.

The dried electrode lump problem is exacerbated when the wet stack MLC manufacturing process is used. In this process the dielectric layer is applied in liquid form over the dried electrode. Any lumps or other imperfections existing in the dried electrode can easily poke through the wet layer and contact the electrode of opposite polarity on the other side of the cast dielectric. The dried electrode lump problem is particularly daunting in the case of the wet stack manufacturing process because this process facilitates making thin dielectric layers.

There are two possible means to eliminating the lump problem in dried electrodes. One is to optimize the process used to disperse the electrode metal powder in the electrode organic vehicle. Techniques such as three-roll-milling, sand-milling, and high speed dispersion are used. Such techniques, however, always have some degree of impact character associated with their dispersion action. Impact can cause the individual grains comprising the electrode powder to aggregate into larger grains which ultimately can become lumps in the printed and fired electrode. This is exacerbated when malleable precious metal powders are used, as is the case for the dispersion of Pd and Pd/Ag powders in MLC electrodes. Even when such dispersion processes are optimized to control powder grain aggregation, there always exists the probability that some powder aggregation will occur. With the high levels of reliability required of MLCs in the present, and in the future, such probabilities are unacceptable.

Another way to eliminate the lump problem is to eliminate, or at least control, the number and size of the lumps present in the powder in the electrode while the powder is being precipitated. Even with an optimized powder dispersion technique, any aggregates present in the starting powder will only be dispersed into the organic vehicle and not broken up into smaller sized grains. It is unlikely, however, that control of such lumps can be achieved using purely chemical techniques during powder precipitation.

Ultimately some physical (non-chemical) means of controlling electrode lumps is needed to enable use of thinner dielectric layers in multilayer ceramic capacitors.

SUMMARY OF THE INVENTION

The invention is directed to an MLC manufacturing process in which the electrode paste is cast or printed onto a rigid substrate. The dried surface of the electrode is rendered smooth by a roller or a calendering process to remove surface asperities. The prints are then transferred to the dielectric substrate through a mask which patterns the electrode print on the surface. Further processing is similar to standard multilayer ceramic capacitor manufacture. An advantage of this process is that it provides for smoother dried electrode layers which allow use of thinner dielectric layer thickness. This results in either more layers possible in the multilayer ceramic capacitor and/or a higher value of capacitance per unit part volume.

In particular, the invention is directed to a method for making electrode/dielectric layers comprising the sequential steps:

A. Casting a thin layer of finely divided conductive metal particles in a solution of volatilizable film-forming polymer binder and volatile organic solvent onto the smooth surface of a low energy rigid substrate and heating the cast dispersion to remove the volatile solvent therefrom;

B. Calendering the exposed surface of the solvent-free dispersion of conductive metal particles in the polymeric binder to remove surfaces asperities;

C. Positioning on the smoothened surface of the dispersion a thin hard metallic imaging mask, the open areas of which are patterned in the image of one or more MLC electrodes;

D. Applying atop the mask a supported flexible unpatterned film of dielectric solids dispersed in a matrix of volatilizable organic polymeric binder;

E. Applying uniform pressure to the unpatterned dielectric film by which the mask is contacted with the conductive metal layer and the conductive metal layer underlying the open areas of the mask is laminated to the dielectric film in the pattern of the MLC electrode(s); and F. Separating the dielectric layer bearing the laminated conductive metal electrode pattern from the mask.

DETAILED DESCRIPTION OF THE INVENTION

The process of this invention is comprised of the following steps:

1. Deposition of the electrode dispersion onto the rigid smooth substrate.
2. Drying of the dispersion.
3. Smoothening of the dried electrode film to remove surface asperities.
4. Transfer of the electrode from the rigid surface to the dielectric through a mask which results in a pattern of electrode on the dielectric.
5. Deposition of another layer of dielectric on the electrode by either the wet or dry stack process.
6. Repeat of steps 1 through 5 until complete stacking of the MLC is achieved.
7. Dicing of individual capacitors from the dielectric/electrode build-up.
8. Burnout, firing, termination, and other processing per standard MLC making procedures.

Details of the materials and equipment involved in this process are outlined below:

1. Electrode paste: The electrode paste or slurry can be a standard composition in which the metal powders are dispersed in a viscous organic vehicle. Or it can be a vehicle with low viscosity in which low concentrations of resins are present. In any case the electrode dispersion should contain solvents which are readily removed through evaporation. The presence of a residual organic film-former is seen as beneficial since it will help hold the electrode film together during the dry transfer process. This resin should have tackiness after drying to promote adhesion of the dried electrode film to the dielectric during dry transfer.

2. Rigid surface: The rigid surface on which the electrode dispersion is placed can be float glass, polished metal, or rigid polymer. The degree of surface smoothness of the rigid surface should be comparable, if not smoother, than the size of the asperities being removed during the smoothening process. It may be desirable to coat the rigid surface with a release agent to facilitate the transfer of the dried electrode through the mask during the dry transfer process.

3. Smoothening apparatus: The smoothening process can be done by pressing a smooth flat plate against the electrode or by passing a smooth roller over the electrode to remove surface asperities. Again, the degree of surface smoothness of the roller or flat surface should be comparable, if not smoother, than the size of the asperities being removed during the smoothening process. Heat may also be used to soften any residual organic resin present in the electrode. It may be desirable to coat the roller or flat plate with a release agent to avoid peeling-off of the dried electrode from the dielectric during smoothening.

4. Dielectric: The dielectric layers can be deposited either from thin dielectric tape or by wet stack casting over previous layers. The wet stack casting can be done by curtain coating, doctor blading or screen printing. Standard dielectric slurry or wet stack formulations can probably be used although some reformulation may be required for compatibility with the transfer process.

5. Transfer Mask: The transfer mask can be a sheet of thin metal through which holes have been machined so as to have a pattern suitable for forming a number of electrode ink patterns on the dielectric substrate. The pattern of the mask would closely resemble the normal electrode printing screens used in standard MLC electrode printing.

The advantages of this process are:

1. Smoother electrode prints can be formed, allowing use of thinner dielectric layers and higher values of capacitance per unit part volume.
2. Even poorly-dispersed, agglomerated/aggregated powders can be used in the electrode since the mechanical smoothening process removes surface asperities. Deagglomerated, well-dispersed powders will offer best properties, however.
3. The electrode can be even lower in resin content since there need be no resin present to impart viscosity to the electrode paste. Some resin will be needed, however, to hold the electrode print together during mask transfer and to promote adhesion to the dielectric.
4. The process is readily automated.
5. The process of mask transfer offer flexibility in the pattern of the electrodes which are formed on the dielectric. A conventional MLC is made using only one pattern in the screen printing screen. Use of a mask would allow the electrodes to be deposited on the dielectric in easily varied patterns by simply changing the mask through which the electrode is deposited.

EXAMPLES

An electrode paste is made using a 30/70 Pd/Ag powder using standard roll-milling technique. The roll-mill base composition is typical, being (in weight percent):

| Ethyl cellulose | 2.9 |
| Staybelite ® Resin[1] | 5.7 |
| Mineral spirits | 17.1 |
| Decanol | 2.9 |
| Pd/Ag powder | 71.4 |
| Total | 100.0 |

[1]Staybelite ® is a tradename of Hercules, Inc., Wilmington DE for modified wood rosin.

The ethyl cellulose and staybelite resin is first dissolved in the mixture of mineral spirits and decanol using a heated resin kettle to form a viscous "medium". Ethyl cellulose is added to the roll-mill base to provide adequate viscosity for good roll-milling. Staybelite resin imparts no viscosity to the roll-mill base but provides a film-forming characteristic when the paste is dried. Decanol and mineral spirits are co-solvents for dissolving the ethyl cellulose and Staybelite resins. The boiling point range of the mineral spirits is chosen so as to evaporate in a convenient time and temperature range for the deposition process to be described later. The Pd/Ag powder is preferably deagglomerated and contains as few agglomerates as possible although an agglomerated (aggregated) powder can be used.

On cooling of the medium the Pd/Ag powder is added by stirring, then the powder is dispersed to as great an extent as possible in the medium using standard roll-milling practices. Powder dispersion is checked after milling using a modified Hegeman gauge with graduations from 0 to 25 microns.

After roll-milling the solids content of the paste is measured using calcination of the paste at 1050 C. in air, weighing the sample before and after calcination. This data is used to dilute the milled paste to a viscosity suitable for doctor blading (1 to 20 PaS at 20/sec shear rate) and a given solids content using the mineral spirits/decanol mixture. The solids content for this example is chosen to be 50% Pd/Ag.

A substrate consisting of a float glass plate 0.25 inches thick is cleaned using lint-free cloths and then a solution of 10/90 (by weight) soya lecithin/isopropanol is wiped on using a lint-free cloth. The isopropanol is allowed to evaporate, leaving behind a thin film of soya lecithin which will act as a release agent for the electrode paste to be applied.

The diluted electrode paste as described above is applied to the glass plate using a doctor blade technique with the doctor blade set at 10 microns. The cast electrode is dried at a temperature high enough to remove all of the mineral spirits present in the electrode slurry, yet low enough to not char or otherwise deleteriously effect the ethyl cellulose and staybelite resin left in the cast electrode film.

A steel roller with adequate surface smoothness is rolled over the dried electrode film with adequate pressure to squeeze any lumps out of the film. The steel roller is also coated with soya lecithin release agent as described above.

A mask consisting of a frame-mounted stretched nickel foil of 0.002 inch thickness with a suitable electrode pattern is coated with release agent of soya lecithin on both side per the techniques above. The mask is brought into contact with the dried electrode print and held there under pressure.

A dielectric tape produced using conventional tape casting techniques is mounted on an elastomeric surface so as to permit supported flexure of the tape through flexure of the elastomeric material underneath it. The dielectric tape, supported by the elastomer, is pressed against the metal mask under pressure, causing the dielectric tape to push through the pattern of holes in the mask and contact the electrode print. Enough heat accompanies this pressure so as to partially melt the staybelite resin in the dried electrode print and render it sticky. As a result of the contact between the dielectric and the electrode print, the electrode print transfers to the dielectric tape and upon retraction of the dielectric tape/elastomeric assembly, the electrode metallization is released from the glass plate and adheres to the dielectric tape.

Further processing consisting of making more electrode transfers onto additional dielectric tapes, stacking the tapes with appropriate registration of the electrode prints and pressing to form a monolithic block. Individual capacitors are then sawn or diced out of the monolithic block and further processing (firing, termination and testing) proceeds as in the case of standard MLC processing.

I claim:

1. A method for making electrode/dielectric layers comprising the sequential steps:
   A. Casting a thin layer of a dispersion of finely divided conductive metal particles in a solution of volatilizable film-forming polymer binder and volatile organic solvent onto the smooth surface of a rigid substrate with a release agent and heating the cast dispersion to remove the volatile solvent therefrom;
   B. Calendering the exposed surface of the solvent-free dispersion of conductive metal particles in the polymeric binder to smoothen it;
   C. Positioning a thin hard metallic imaging mask, the open areas of which are patterned in the image of one or more multilayer ceramic capacitor electrodes on the smoothened surface of the dispersion,
   D. Applying a supported flexible unpatterned film of dielectric solids dispersed in a matrix of organic polymeric binder on top of the mask;
   E. Applying uniform pressure to the unpatterned dielectric film such that the dielectric film contacts the conductive metal layers exposed by the mask, and the conductive metal layers laminate to the dielectric film to form a pattern of the multilayer ceramic capacitor electrode (s); and
   F. Separating the dielectric layer bearing the laminated conductive metal electrode pattern from the mask.

2. The method of claim 1 in which the supported flexible unpatterned dielectric film is a dielectric green tape.

3. The method of claim 1 in which the flexible unpatterned dielectric film is applied by screen printing, curtain coating and drying a dielectric thick film paste.

4. The method of claim 1 in which the flexible unpatterned dielectric film is applied by curtain coating and drying the coated film.

5. The method of claim 1 in which the flexible unpatterned dielectric film is applied by doctor blading and drying the applied film.

6. The method of claim 1 in which the surface of the rigid substrate is coated with an organic release agent.

7. The method of claim 1 in which the under surface of the mask is coated with an organic release agent.

* * * * *